UNITED STATES PATENT OFFICE.

THOMAS DANIEL KELLY, OF SOUTHEND-ON-SEA, ENGLAND.

PLASTIC COMPOSITION.

1,194,184. Specification of Letters Patent. Patented Aug. 8, 1916.

No Drawing. Application filed August 19, 1911. Serial No. 644,932.

*To all whom it may concern:*

Be it known that I, THOMAS DANIEL KELLY, a subject of the King of Great Britain, residing at Southend-on-Sea, England, have invented certain new and useful Improvements in Plastic Compositions, of which the following is a specification.

This invention relates to the production of a water and heat proof material which has excellent insulation properties and, when mixed with filling materials, can be employed as a substitute for india-rubber. For the production of this mixture a material is employed which is obtained from peat, plants containing mucilaginous or resinous matter, such as marshmallow, and many varieties of seeds, husks of seeds or the like, also containing mucilaginous or resinous matter, such as linseed or cotton-seed, these substances being boiled in a closed vessel with the addition of an alkali, should the raw material not contain alkali, until the liquid portion thereof is of a cream-like consistency, whereupon the latter is separated by filtration from the portion remaining undissolved. The mixture thus obtained, which consists substantially of mucilage and resin, is for the most part soluble in water and may be mixed with inert filling material, preferably in a pulverized form, in order to make it plastic, and so that objects may be made with it.

According to the invention, this material is treated so that when cold it becomes tenacious and viscous and is insoluble in water. For this purpose, the material with which the process is commenced is powerfully heated together with vegetable oil, in the presence of cement capable of being set by hydration. In this way a kind of viscous glue is obtained which can be applied to surfaces for the purpose of making them waterproof and heat resisting. The product is a bad conductor of electricity and can be suitably employed as insulating material. When the usual filling material is employed it is plastic and suitable for the production of objects.

The objects are produced in the following manner: The material with which the process is commenced is taken in a moist or a pulverous state and thoroughly mixed with hydraulic cement and with double the quantity of vegetable oil, and the mixture after the addition of a usual filling material. *e. g.* ground burnt clay, heated to about 105 to 372° C. The result is a mixture which can be cast in molds and after cooling is ready for use. The oils may be crude or oxidized, or be preliminarily treated with nitric acid or a mixture of nitric sulfuric acid. In order to produce a substitute for india-rubber from this material 10 to 30% of a cement, which sets by hydration, is added to the mixture, which is in a hot state, whereby a tenacious viscous substance is obtained which is insoluble in water and can be conveniently applied to surfaces. If objects are to be made with the material it is mixed in the known manner with filling material, for example, ground burnt clay which destroys the adhesiveness or tenaciousness thereof.

Having fully described my invention, I claim:

A method of producing a substance for use as a substitute for india rubber or as a cementing medium, consisting of boiling plants seeds or seed husks containing mucilaginous or resinous matter with alkali, producing a mucilaginous or resinous substance, and mixing said substance with vegetable oils and hydraulic cement.

In testimony whereof I have hereunto set my hand in presence of two subscribing witnesses.

THOMAS DANIEL KELLY.

Witnesses:
RICHARD CORE GARDNER,
LYNWOOD F. GARDNER.